(12) United States Patent
Apte et al.

(10) Patent No.: US 8,117,138 B2
(45) Date of Patent: Feb. 14, 2012

(54) METHOD AND APPARATUS FOR LOCATION EVALUATION AND SITE SELECTION

(75) Inventors: Chidanand Apte, Chappaqua, NY (US); Jin Dong, Beijing (CN); Ta-Hsin Li, Danbury, CT (US); Ming Xie, Beijing (CN); Wen Jun Yin, Beijing (CN); Bin Zhang, Beijing (CN); Ming H. Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 12/046,256

(22) Filed: Mar. 11, 2008

(65) Prior Publication Data

US 2009/0234782 A1 Sep. 17, 2009

(51) Int. Cl.
*G06F 15/18* (2006.01)
*G06N 3/08* (2006.01)
(52) U.S. Cl. ................. 706/12; 706/20; 706/21; 706/25
(58) Field of Classification Search ...................... 706/12
See application file for complete search history.

(56) References Cited

OTHER PUBLICATIONS

Mendes et al., Clustering supermarkets: the role of experts [online], 2006 [retrieved on Mar. 26, 2011]. Retrieved from the Internet:< URL:http://www.sciencedirect.com/science?_ob=ArticleURL&_ udi=B6VGN-4JSP4MP-2&_user=2502287&_ coverDate=07%2F31%2F2006&_rdoc=1&_fmt=high&_ orig=gateway&_origin=gateway&_sort=d&_docanchor= &view=c&searchStrld=1694693575&.*

* cited by examiner

*Primary Examiner* — Jeffrey A Gaffin
*Assistant Examiner* — Nathan Brown, Jr.
(74) *Attorney, Agent, or Firm* — Scully, Scott, Murphy & Presser, P.C.; Daniel P. Morris, Esq.

(57) ABSTRACT

Method, apparatus and system for location evaluation and site selection, capable of effectively configuring the site network and evaluating the facility location by scientifically modeling and incorporating human knowledge are provided. In one aspect, geographic and demographic data associated with a plurality of locations and human knowledge comprising partial rating knowledge and pair-wise preference knowledge are used in a regression algorithm to construct a location evaluation model. The regression algorithm is further refined using active learning that identifies a plurality of pairs of locations to improve precision of the regression algorithm.

19 Claims, 4 Drawing Sheets

METHOD AND APPARATUS FOR LOCATION EVALUATION AND SITE SELECTION

FIELD OF THE INVENTION

The present application generally relates to mathematical and optimization modeling, and more particularly to a method and apparatus for location evaluation and site selection.

BACKGROUND OF THE INVENTION

Facilities or outlets such as bank branches, retail store, automobile dealer, and like are considered important but costly channels for companies in serving their customers and winning in the competitive marketplace. A critical issue to address is how to evaluate the facility site location and optimize the site network to serve more customers. In those problems, a key point is to construct the location evaluation model to judge how much the location is suitable for opening such a facility. Known methods combine multiple facility performance metrics by weighted sum to setup the location evaluation model. Such models, however, are not completely accurate, and it is difficult to assign the weight coefficients properly.

An accurate location evaluation model is difficult to construct because of the very complex evaluation mechanism and lack of sample data. For instance, a mechanism for evaluating location should consider multiple metrics simultaneously to evaluate whether a location is good or bad. For example, in banking, it should consider several metrics such as deposit, loan, financial service revenue, and cost, however, it is difficult to model those factors into a single objective function to be optimized. Known methods combine multiple facility performance metrics by weighted sum to setup the location evaluation model, however, it is difficult to assign the weight coefficients properly, and the models usually are not accurate. Further, known methods do not allow users to input their knowledge or experience to aid in evaluation.

Lack of rating data of facility locations is another challenge posed in evaluating locations. It is almost impossible to obtain the complete rating data of facility locations, making it difficult to conclude the evaluation rules from sample data using statistical or learning methods.

Thus, what is desirable is a method and apparatus for location evaluation and site selection, capable of effectively configuring the site network and evaluating the facility location by scientifically modeling and incorporating human knowledge.

BRIEF SUMMARY OF THE INVENTION

A system and method for evaluating location and selecting site for one or more facilities are provided. The system, in one aspect, may comprise a location evaluation learning module operable to receive geographic, demographic data and human knowledge associated with a plurality of locations. The location evaluation learning module uses regression algorithm to construct a location evaluation model enabled to evaluate one or more locations. A knowledge retrieval interface is operable to guide a user to input said human knowledge using active learning.

A method of evaluating location and selecting site for one or more facilities, in one aspect, may comprise receiving geographic and demographic data associated with a plurality of locations and receiving human knowledge associated with said plurality of locations. Human knowledge comprises partial rating knowledge and pair-wise preference knowledge. The method may also include using regression algorithm incorporating the human knowledge and constructing a location evaluation model. The method may further use active learning to identify a plurality of pairs of locations based on the geographic and demographic data to improve precision of the regression algorithm.

A program storage device readable by a machine, tangibly embodying a program of instructions executable by the machine to perform a method of evaluating location and selecting site for one or more facilities may be also provided.

Further features as well as the structure and operation of various embodiments are described in detail below with reference to the accompanying drawings. In the drawings, like reference numbers indicate identical or functionally similar elements.

DETAILED DESCRIPTION

A method and apparatus is provided that builds a location evaluation model using a mathematical analysis. A location evaluation model evaluates how much a location is suitable for a facility site. In one embodiment, a regression method is used that scientifically integrates two types of human knowledge to construct a location evaluation model. The regression method is a multiple semi-supervised regression using, for example, two types of human knowledge as semi-supervised information. One type includes partial rating knowledge. In partial rating knowledge, the user identifies "best" and "worst" locations in the training data set or similarly provides the rating value of the locations. Another type of information used in the regression method is pair-wise preference knowledge. In pair-wise preference knowledge, the user provides preferences for some or all pairs of locations in the training data set. In addition, the method and apparatus of the present disclosure in one embodiment may use active learning technology to actively and automatically guide a user to input information, which can help improve regression precision.

Figure 2:
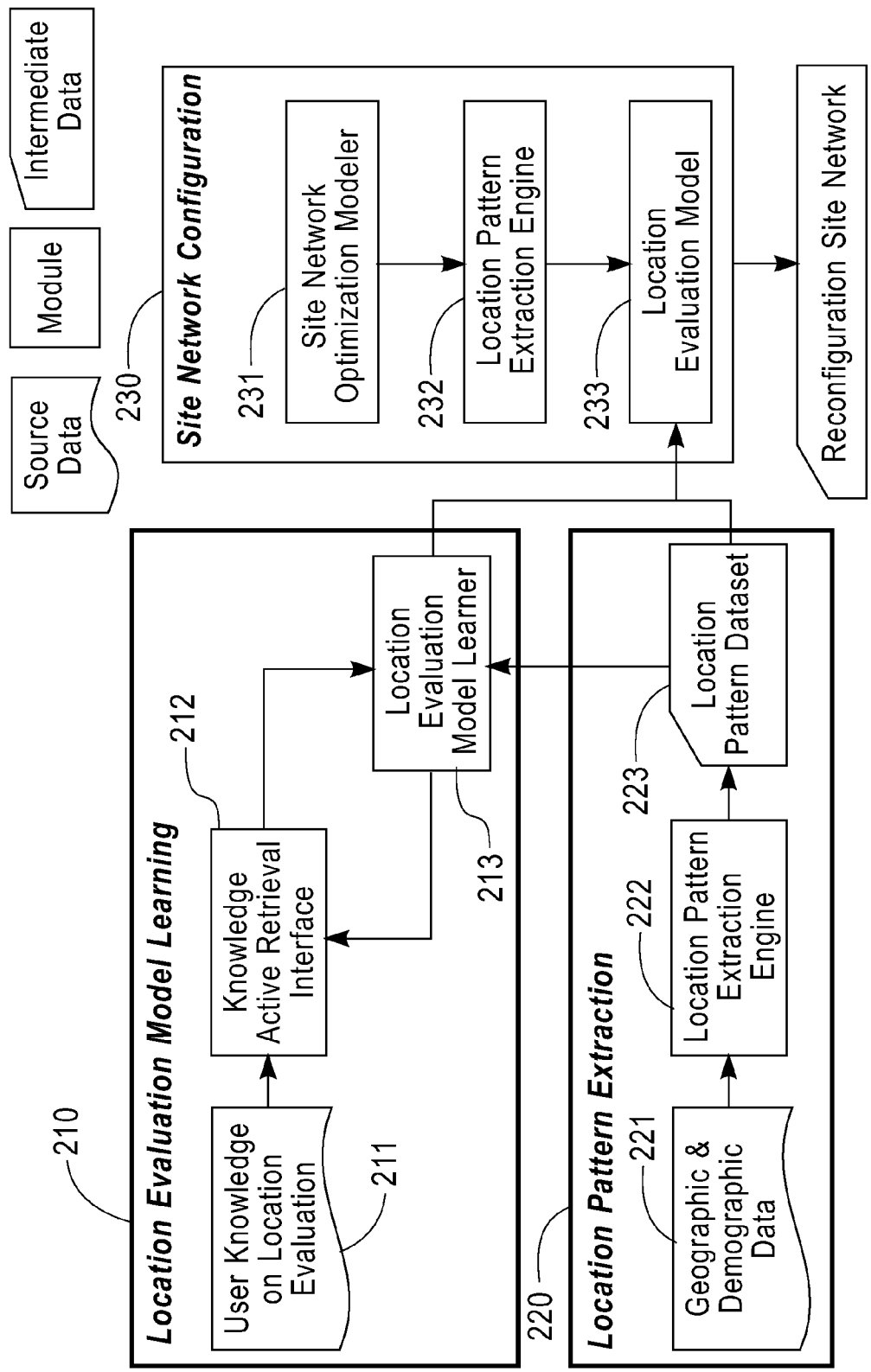
FIG. 2 shows functional components for evaluating location and selecting sites in one embodiment.

In the present disclosure, at least two algorithms are provided. One is the Location evaluation learning algorithm, which uses "regression", or "semi-supervised regression" technology. "Semi-supervised regression" performs regression using partial rating information. In "supervised regression," complete rating information is used. For example, if there are 3 data samples $x_1$, $x_2$, and $x_3$, regression using the knowledge of all the rating values of them, $y_1$, $y_2$, $y_3$, is referred to as supervised regression. Regression using the rating values of part of them (e.g., $y_1$ and $y_3$ known, $y_2$ not known) is referred to as semi-supervised regression. Another algorithm is the active learning algorithm, which can actively guide the user to input most useful pair-wise preference information (that is, the preferences of most useful pairs) so that the system can get better regression precision with less pair-wise preferences. For example, semi-supervised regression can be performed by choosing pair-wise preference ($x_1$ is better than $x_2$) or ($x_1$ is better than $x_3$), but which choice is better to get more precise result? Active learning technologies of the present disclosure can tell which is better. The system in one embodiment can use active learning to guide user to actively choose the most useful pair-wise information. In FIG. 2, 213 uses regression to construct location evaluation model based on current information, then it uses active learning technology to identify most useful pair-wise preferences, and sends the pairs to 212. After that, 212 guides user to input the most useful preferences.

In one embodiment of the method and apparatus, only geographic and demographic data for location evaluation and site location are used, unlike known methods that not only need geographic and demographic data, but also company internal data such as bank transaction data, and bank account data, which may not be easily obtained.

Figure 1:
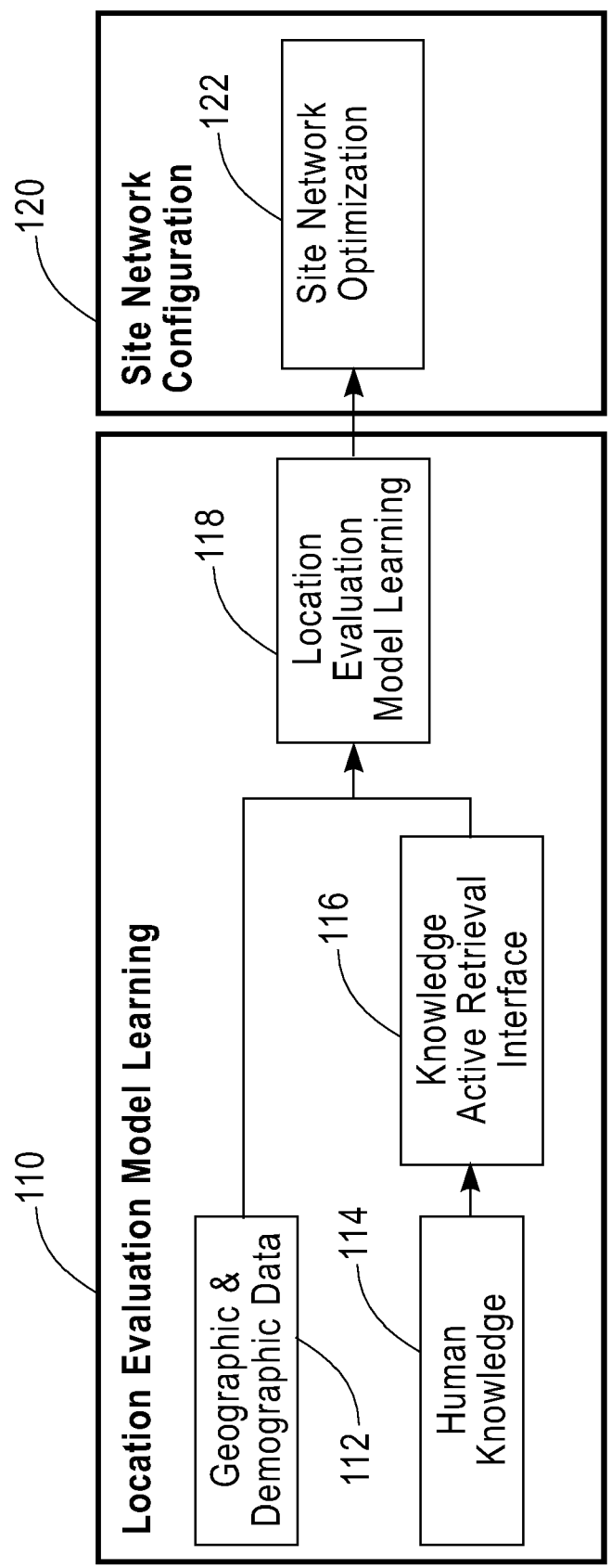
FIG. 1 shows a method in one embodiment of evaluating location and selecting sites.

FIG. 1 shows a method in one embodiment of evaluating location and selecting sites. In this embodiment, location evaluation and site selection may utilize Location Evaluation Model Learning (110) module and Site Network Configuration (120) module. Geographic and demographic data 112 is collected and/or retrieved. Human knowledge 114 is collected and/or retrieved. In one aspect, these source data are more easily obtained than the data typically used by known methods. For instance, geographic and demographic data can be provided by GIS data vendors. Human knowledge can be easily input by user The method of the present disclosure in one embodiment does not need to collect or use internal data such as transaction or customer member data to evaluate location and select sites.

At 116, an interface module such as graphical user interface or any other interface identifies types of knowledge to input into the system. Thus, an interface module 116 may help the user in inputting the human knowledge 114. One type of knowledge is partial rating knowledge, which a user may be guided to input. This type of knowledge specifies the "best" and "worst" locations, and ratings of one or more, or at least some, facility locations. Another type of knowledge is pair-wise preference knowledge. The interface module may guide the user to compare two locations and select the better location of the two. At 116, an interface module guides users to input their knowledge conveniently and also automatically checks partial ranking and preference consistency For example, if a user inputted that A is better than B, and B is better than C before, and now he inputs C is better than A, the interface will check the consistency and warn the user that it is not consistent with what was entered previously.

Location Evaluation Model evaluates how much a location is suitable for a facility site. The location evaluation model includes a method or schema that can evaluate how good a given location is. Location evaluation model learning 118 automatically generates (or learns) the location evaluation model which may be used in Site Network Optimization 122. Location Evaluation Model is constructed by Location Evaluation Model Learning 118 in one embodiment using regression incorporating the two types of human knowledge: partial ratings and pair-wise preferences. Thus in one embodiment, regression is used to generate location evaluation model. The location pattern of each location computed from geographic & demographic data, and the two types of human information are input to the regression model, and the regression model outputs the true ranking value of each location, that is f(i).

Location Evaluation Model Learning 118 uses active learning to actively identify pairs of locations to be compared which can mostly improve the regression precision. Partial rating knowledge is modeled by least square, and pair-wise preference knowledge is modeled by cross entropy, in one embodiment. Many different active learning algorithms can be used in the present disclosure. An example of an active learning algorithm, which can be used, is explained below. After the regression computes the true ranking value f(i), the active learning algorithm can use the following criteria to choose the pairs of locations: suppose f(i)s are sorted in descending order, (that is, if j>i, then f(j)>f(i).), defining: $D(i,j)=0.5*(|f(i)-0.5|+|f(j)-0.5|)+|f(j)-f(i)|$. For each f(i) and f(i+1), computes the D(i, i+1), and choose the pair x(i) and x(i+1) as the recommended pair if the x(i) and x(i+1) have the most minimum D(i, i+1) value. So, in this embodiment of active learning, the input are the f(i)s, and the output are pairs of locations which are chosen to be further identified partial rating and pair-wise preference by user.

Site Network Configuration 120 builds an optimization model 122 to reconfigure the facility locations of the site network including existing facility reconfiguration and new facility configuration. Examples of suggestions or recommendations output by the optimization model 122 may include, but are not limited to, keeping one or more existing locations and specifying which ones to keep, relocating one or more current facilities to new locations, opening new sites in some locations, and closing one or more facilities.

FIG. 2 illustrates a detailed implementation of the system of evaluating location and selecting sites in one embodiment. Location Evaluation Model Learning (210) constructs a location evaluation model 233 using semi-supervised learning technology, for example, using partial rating and pair-wise preference knowledge. Semi-supervised learning refers to a set of machine learning technologies, which use partial supervised information instead of complete supervised information. This module 210 in one embodiment may include the following functional or logical components: User Knowledge on Location Evaluation (211), Knowledge Active Retrieval Interface (212), and Location Evaluation Model Learner (213).

User Knowledge on Location Evaluation (211) comprises source data. This data may be stored in a repository and retrieved therefrom and/or input or retrieved dynamically. Experts always have knowledge on site location evaluation, even if they cannot conclude exactly what rules the location evaluation model should have. The present disclosure provides a proper system to extract site location knowledge from experts, and construct the mathematical model from using of the knowledge. In the method and system of the present disclosure, two types of human knowledge are identified and inputted. While experts may not be able to provide the full ranking of a set of locations, they can easily supply the following types of information:

Partial Ranking knowledge. Experts can provide the "best" locations and the "worst" locations. They may be also able to provide the ranking of at least some locations. For example, they can provide what is the "top 1" location, and what is the "top 2" location, or what is the "bottom 1" location and what is the "bottom 2" location. This type of knowledge can provide the ranking value of some of the locations. Thus, it is referred to herein as "Partial Ranking Knowledge".

Pair-wise Preference knowledge. Experts may not be able to provide the exact ranking of locations, but given two locations, they can easily make the decision as to which location is better. This type of knowledge can provide the preference between a pair of locations, that is, Pair-wise Preference.

Figure 3:
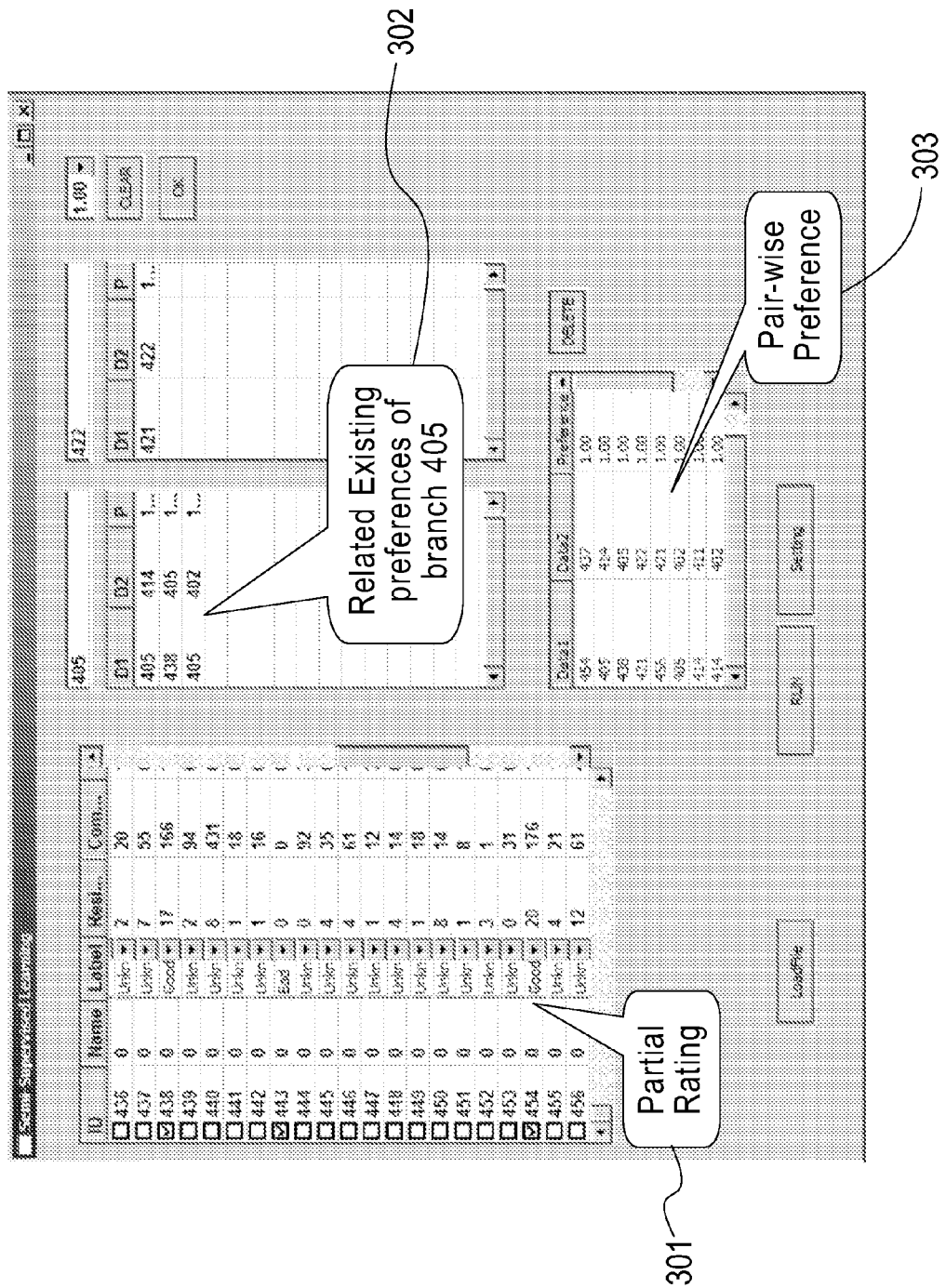
FIG. 3 shows an example of an interface that guides user to input types of knowledge.

Knowledge Active Retrieval Interface (212) guides experts or users to input the above types of knowledge. FIG. 3 shows an exemplary instance of the interface. The interface may the user to specify the partial ranking value of each location, that is, to specify whether a location is "best" or "worst", or "unknown" as shown at (301) in FIG. 3. The interface may also allow the user to find the existing pair-wise preference results of the two locations, for instance, for an arbitrary pair of locations as shown at (302) in FIG. 3. The interface may further allow the user to select or set the better location between a pair of arbitrary locations as shown at (303) in FIG. 3.

Location Evaluation Model Learner (213) integrates the human knowledge and constructs a location evaluation model 233. For example, using the types of knowledge input via the interface (212) and patterns of locations output from Location Extraction Pattern module (220), the Location Evaluation Model Learner (213) builds a location evaluation model.

The Location Evaluation Model Learner (213) in one embodiment estimates the evaluation value (rating) $f_i$ of facility location pattern $x_i$. $f_i$ can indicate how good the location $x_i$ is, and its value is in range [0,1].

Input Data is the Location Pattern Set, a set of location patterns of facilities $X=(x_1\ x_2\ \ldots\ x_n)^T$, where X are combined by the features of the trade area of the facility location. For example, x1 is the population number in the area, x2 is the number of stores in the area, etc.

In one embodiment, human knowledge is modeled by:

Partial Ranking Knowledge: if user can determine some locations are best, the values for those locations are 1. If some locations can be judged as worst, their values are 0. If some of locations' ranking values can be estimated, they can be values in the range of [0,1].

Pair-wise Preference Knowledge: when comparing $(x_j, x_k)$, if the location $x_j$ is better than $x_k$, then $y_j - y_k = 1$; otherwise $y_1 - y_k = -1$. y(i) is the given ranking value of x(i) inputted initially by user.

In one embodiment, an optimization objective function is constructed as:

$$\min\left\{\sum_{i\in R}(y_i-f_i)^2 + \sum_{j,k\in P} C(f_i-f_k) + \lambda_1\|f\|_H + \lambda_2\|f\|_M\right\}$$

In this objective function, the sum of four terms as described below is minimized with respect to the variable f. Each of the four terms may be minimized in order to minimize the sum. The last two terms in the object function may be optional. Thus, the above objective function may include the first two terms only; the first two terms and either third or fourth term; or the first two terms and both third and fourth terms.

The first term $$\sum_{i\in R}(y_i-f_i)^2$$

uses a least-square model to measure the fittingness of partial rating semi-supervised information. If the estimated ranking values are closer with the given ranking values, the total value of the term is smaller. y(i) is the given ranking value of x(i) inputted initially by user, thus y(i) is known. f(i) is the true ranking value of x(i) which is unknown and which is being computed or estimated.

The second term $$\sum_{j,k\in P} C(f_i-f_k)$$

uses cross entropy to measure the fittingness of pair-wise preference information. $C(f_i-f_k)$ is defined by the form of cross entropy: $C(f_i-f_k)=-\overline{P_{jk}}\log(P_{jk})-(1-\overline{P_{jk}})\log(1-P_{jk})$, and $$P_{jk} = \frac{1}{1+e^{-\lambda(f_j-f_k)}}.$$

The set P which j and k belong to refers to the location set that have been compared in the Knowledge Active Retrieval Interface. $\overline{P_{jk}}$ refers to the expression $$\overline{P}_{jk} = \frac{1}{1+e^{-\lambda(y_j-y_k)}}$$

with the exact values of $y_i$ from the set P.

The third term $\|f\|_H$ measures the smoothness of the value curve $f_i$ in Hilbert space. The definition of $\|f\|_H$ is given by $\|f\|_H = f^T K^{-1} f$, where K(i,j) is the inner product of $(x_i, x_j)$.

The fourth term $\|f\|_M$ measures the smoothness of the function on the graph. The definition of $\|f\|_M$ is given by $$\|f\|_M = f^T(D-A)f = \sum_{j,k} A_{jk}(f_j-f_k)^2.$$

Matrix A refers to the adjacency matrix of the graph: $A_{jk}=1/d(X_j,X_k)$. That is, if the distance of $X_j$ and $X_k$ is shorter in its original space, then the distance of $f_j$ and $f_k$ will be shorter. $f_i$ can be estimated by minimizing the objective function using Newton-Raphson iteration.

Figure 4:
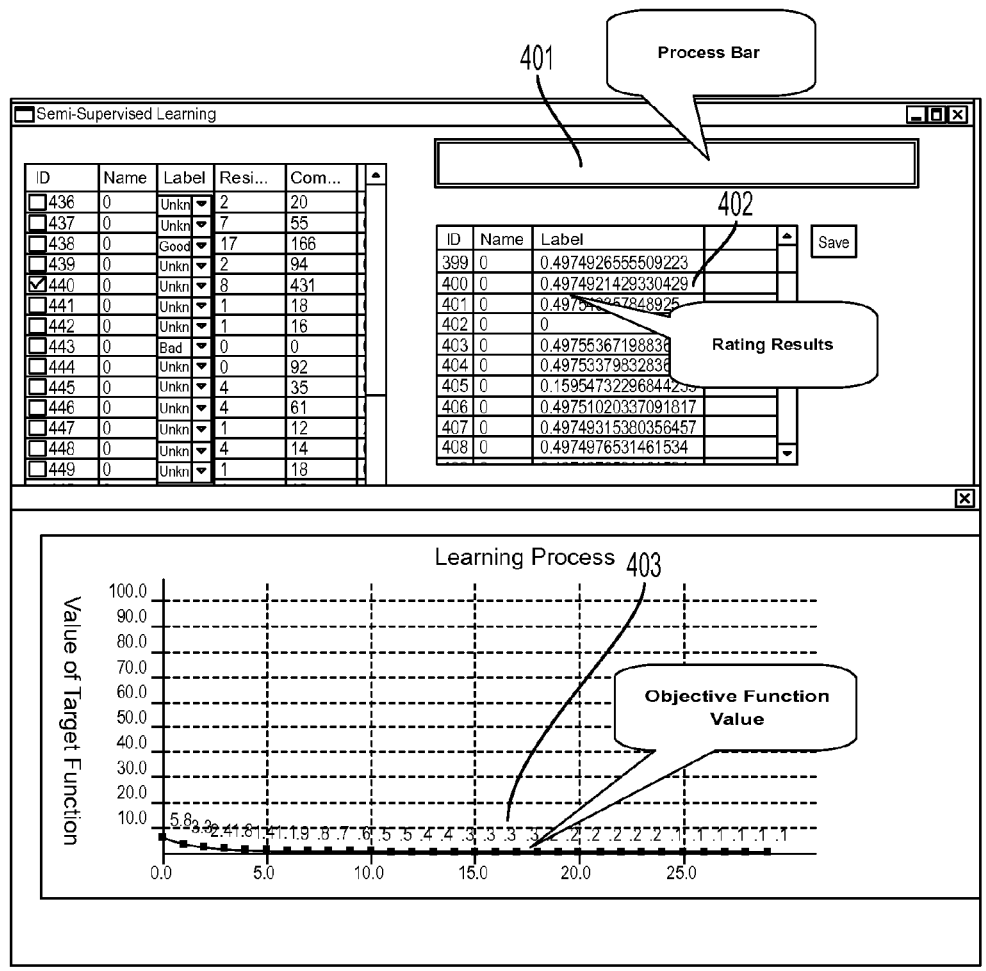
FIG. 4 shows an example of interface presenting location evaluation results.

FIG. 4 shows an exemplary result of location evaluation learning. FIG. 4 at 401 shows a process bar. When the learning process is running, the bar can indicate how many iterations have been performed. FIG. 4 at 402 shows the estimated ranking values from 0 to 1. FIG. 4 at 403 indicates the values of the objective function in every iteration step. The objective value becomes smaller with more iteration. Recall that the objective value in the example above is the value of $$\min\left\{\sum_{i\in R}(y_i-f_i)^2 + \sum_{j,k\in P} C(f_i-f_k) + \lambda_1\|f\|_H + \lambda_2\|f\|_M\right\}$$

under the f(i) computed by Newton-Raphson iteration.

Referring to FIG. 2, Location Pattern Extraction (220) module extracts the patterns and the mathematical description of locations from the spatial data set and locations. The Location Pattern Extraction (220) module utilizes the source, Geographic & Demographic Data (221), and the Location Pattern Extraction Engine (222). The results are stored in Location Pattern Dataset (223).

Geographic and Demographic Data (221) in one embodiment includes basic data source of the system of the present disclosure. It includes the positions of various buildings and facilities, and their demographic attributes, for example, the position of office buildings and their size, the position of residential points and their population. Those data can be organized and stored in GIS format.

Location pattern refers to a mathematical description of location. Location Pattern Extraction Engine (222) extracts information from the Geographic & Demographic Data (221) and derives mathematical description of a location. One exemplary location pattern is the numbers of all types of facilities and/or buildings in the neighbor circle areas with radius of 200 m (meter), 400 m, . . . , 1000 m of the location, given a location position. For example, if a given location is a cross of two streets, its pattern is a vector of values: $X=(x_1 x_2 \ldots x_n)^T$, where, x1 is the number of residential points in the 1000 meter radius circle of the cross point, x2 is the number of office building points in the 1000 meter radius circle of the cross point, . . . , etc. The extraction engine computes the patterns of given locations. All the patterns can be stored in Location Pattern Dataset (223).

Site Network Configuration (230) provides the recommended locations using global optimization algorithms and location evaluation model. This module utilizes Site Network Optimization Modeler (231), and also works with Location Pattern Extraction Engine (232) and Location Evaluation Model (233) constructed in Location Evaluation Model Learning (210). The Site Network Configuration (230) may use its own copy or Version of the location pattern extraction engine (232) or may use the location pattern extraction engine of the location pattern extraction module 220. Thus, the location pattern extraction engine (232) may be shared between the Site Network Configuration (230) and the location pattern extraction module 220 in one embodiment of the present disclosure.

Site Network Optimization Modeler (231) models the site network configuration problem as MCLP (maximum coverage location problem), which can be solved by operation research algorithms, such as Genetic Algorithm, Tabu Search. Genetic Algorithm and Tabu Search Genetic Algorithms (GAs) are known adaptive heuristic search algorithm based on the evolutionary ideas of natural selection and genetics. They represent an intelligent exploitation of a random search used to solve optimization problems, and exploit historical information to direct the search into the region of better performance within the search space. The basic techniques of the GAs are designed to simulate processes in natural systems necessary for evolution, specially those follow the principles first laid down of "survival of the fittest Tabu search uses a local or neighborhood search procedure to iteratively move from a solution x to a solution x' in the neighborhood of x, until some stopping criterion has been satisfied. To explore regions of the search space that would be left unexplored by the local search procedure (see local optimality), Tabu search modifies the neighborhood structure of each solution as the search progresses. The solutions admitted to N*(x), the new neighborhood, are determined through the use of special memory structures. The search then progresses by iteratively moving from a solution x to a solution x' in N*(x).

Various aspects of the present disclosure may be embodied as a program, software, or computer instructions embodied in a computer or machine usable or readable medium, which causes the computer or machine to perform the steps of the method when executed on the computer, processor, and/or machine.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for evaluating location and selecting site for one or more facilities, comprising:

a location evaluation learning module operable to receive geographic, demographic data and human knowledge associated with a plurality of locations, the location evaluation learning module using regression algorithm to construct a location evaluation model enabled to evaluate one or more locations; and a knowledge retrieval interface operable to guide a user to input said human knowledge using active learning, wherein the location evaluation learning module incorporates two types of human knowledge comprising partial rating knowledge and pair-wise preference knowledge, wherein said partial rating knowledge includes best and worst locations specified by a user.

2. The system of claim 1, wherein said partial rating knowledge includes one or more rating values of one or more locations respectively.

3. The system of claim 1, wherein said pair-wise preference knowledge includes comparison of two locations.

4. The system of claim 1, wherein the location evaluation learning module is further operable to model partial rating knowledge using least square and model pair-wise preference knowledge using cross entropy, the location evaluation learning module further operable to integrate the partial rating knowledge and the pair-wise preference knowledge to construct said location evaluation model.

5. The system of claim 1, wherein said knowledge active retrieval interface is further operable to automatically check consistency of said partial ranking knowledge and said pair-wise preference knowledge.

6. The system of claim 1, wherein said knowledge active retrieval interface includes a graphical user interface.

7. The system of claim 1, further including a site network optimization module operable to optimize and select sites based on location evaluation output from the location evaluation model.

8. The system of claim 1, further including a location pattern extraction engine operable to derive mathematical description of one or more locations from the geographic, demographic data, said mathematical description used by said location evaluation model learner module in learning said location evaluation model.

9. The system of claim 1, wherein said location evaluation model is an optimization model.

10. The system of claim 1, wherein said location evaluation model solves an objective function $$\min\left\{\sum_{i\in R}(y_i - f_i)^2 + \sum_{j,k\in P}C(f_i - f_k) + \lambda_1\|f\|_H + \lambda_2\|f\|_M\right\}.$$

11. The system of claim 1, wherein said location evaluation model solves an objective function:

$$\min\left\{\sum_{i\in R}(y_i - f_i)^2 + \sum_{j,k\in P}C(f_i - f_k) + \lambda_1\|f\|_H\right\}.$$

12. The system of claim 1, wherein said location evaluation model solves an objective function:

$$\min\left\{\sum_{i\in R}(y_i - f_i)^2 + \sum_{j,k\in P}C(f_i - f_k) + \lambda_2\|f\|_M\right\}.$$

13. A method of evaluating location and selecting site for one or more facilities, comprising:
   receiving geographic and demographic data associated with a plurality of locations;
   receiving human knowledge associated with said plurality of locations, said human knowledge comprising partial rating knowledge and pair-wise preference knowledge;
   using a regression algorithm incorporating said human knowledge and constructing a location evaluation model, the step of using a regression algorithm further including using active learning, by a processor, to identify a plurality of pairs of locations based on said geographic and demographic data to improve precision of the regression algorithm; and
   modeling said pair-wise preference knowledge by cross entropy.

14. The method of claim 13, further including:
   optimizing site selection based on location evaluation output by said location evaluation model.

15. The method of claim 13, further including modeling said partial rating knowledge by least square.

16. The method of claim 13, further including guiding a user to input said partial rating knowledge and said pair-wise preference knowledge.

17. The method of claim 16, wherein said guiding step further includes presenting a pair of selected locations and allowing a user to select a better location of the pair.

18. A program storage device readable by a machine, tangibly embodying a program of instructions executable by the machine to perform a method of evaluating location and selecting site for one or more facilities, comprising:
   receiving geographic and demographic data associated with a plurality of locations;
   receiving human knowledge associated with said plurality of locations, said human knowledge comprising partial rating knowledge and pair-wise preference knowledge; and
   using a regression algorithm incorporating said human knowledge and constructing a location evaluation model, the step of using regression algorithm further including using active learning to identify a plurality of pairs of locations based on said geographic and demographic data to improve precision of the regression algorithm; and
   modeling said pair-wise preference knowledge by cross entropy.

19. The program storage device of claim 18, guiding a user to input said partial rating knowledge and said pair-wise preference knowledge.

* * * * *